US009520732B1

(12) United States Patent
Noble, Jr. et al.

(10) Patent No.: US 9,520,732 B1
(45) Date of Patent: *Dec. 13, 2016

(54) REGULATE CURRENT BATTERY USAGE OF A MOBILE DEVICE

(71) Applicant: Noble Systems Corporation, Atlanta, GA (US)

(72) Inventors: James K. Noble, Jr., Marietta, GA (US); Christopher S. Haggerty, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,939

(22) Filed: Jul. 15, 2016

Related U.S. Application Data

(63) Continuation of application No. 14/454,938, filed on Aug. 8, 2014, now Pat. No. 9,431,842.

(51) Int. Cl.
H02J 7/00 (2006.01)
H04W 4/00 (2009.01)
H04L 12/26 (2006.01)
H04W 88/02 (2009.01)

(52) U.S. Cl.
CPC .............. *H02J 7/0054* (2013.01); *H02J 7/007* (2013.01); *H04L 43/16* (2013.01); *H04W 4/001* (2013.01); *H04W 88/02* (2013.01)

(58) Field of Classification Search
CPC .......... H02J 7/007; H02J 7/008; H02J 7/0052; H02J 7/0054

USPC ........ 320/103, 114, 134, 136–138, 160–161; 340/636.1; 713/320, 340

See application file for complete search history.

(56) References Cited

U.S. PATENT DOCUMENTS

| 6,211,649 | B1 | 4/2001 | Matsuda | |
|---|---|---|---|---|
| 6,531,845 | B2 | 3/2003 | Kerai et al. | |
| 2002/0053895 | A1* | 5/2002 | Simoes | H02J 7/0034 320/114 |
| 2007/0236975 | A1 | 10/2007 | Lippojoki et al. | |
| 2009/0134836 | A1 | 5/2009 | Zhao et al. | |
| 2009/0174370 | A1* | 7/2009 | Gilling | G01R 31/3665 320/160 |
| 2012/0231857 | A1 | 9/2012 | Hsu | |
| 2012/0299554 | A1 | 11/2012 | Kruglick | |

(Continued)

FOREIGN PATENT DOCUMENTS

GB 2479062 9/2011
WO WO 2014/006619 1/2014

*Primary Examiner* — Paul Dinh

(57) ABSTRACT

Various embodiments of the invention provide methods, systems, and computer-program products for charging a battery of a first mobile device from a battery of a second mobile device. In particular embodiments, a request is received identifying an amount of charge to provide from the battery of the second device to the battery of the first device. Accordingly, a determination is made as to whether the amount of charge requested is likely to result in a battery charge of the second device dropping below a threshold value before the battery of the device is recharged based on historical battery charge usage data of the device over a past period of time. If the amount of charge is not likely to result in the battery charge dropping below the threshold value, then the battery of the first device is charged with the amount of charge from the battery of the second device.

18 Claims, 10 Drawing Sheets

(56) References Cited

U.S. PATENT DOCUMENTS

2013/0119942 A1* 5/2013 Sutarwala ............. H02J 7/0004
  320/137
2014/0203758 A1 7/2014 Moshfeghi
2014/0340043 A1 11/2014 Hargrave

* cited by examiner

REGULATE CURRENT BATTERY USAGE OF A MOBILE DEVICE

CROSS REFERENCE TO RELATED APPLICATIONS

This application is a continuation of U.S. patent application Ser. No. 14/454,938, entitled Regulate the Charging of a Mobile Device and filed on Aug. 8, 2014, the entire contents of which are incorporated by reference for all that they teach.

BACKGROUND

The battery charge of a mobile device is limited and can inconvenience the user of the device when the battery power is too low to properly support functionality on the device. In many instances, the user of the mobile device may not have the capability to immediately plug the mobile device into a charger to recharge the battery. Therefore, under these circumstances, it would be convenient if the user could charge his mobile device from another person's mobile device.

With that said, the other person must take precaution not to provide too much of a charge from her device that would leave her in a position in which the battery charge of her mobile device will become too low to properly support functionality on her device before she has had an opportunity to recharge her device. It is with respect to these considerations and others that the disclosure herein is presented.

BRIEF SUMMARY

In general, embodiments of the present invention provide computer-program products, methods, systems, apparatus, and computing entities for charging a battery of a first mobile device such as, for example, a cellular smart phone or a tablet coupled over a connection with a second mobile device providing a charge from a battery of the second mobile device. For instance, in particular embodiments, the connection may comprise one of (1) a USB connector coupling the first mobile device with the second mobile device and (2) inductive charging coupling the first mobile device with the second mobile device.

Accordingly, in particular embodiments, a request is received that is initiated by a user of the second mobile device identifying an amount of charge to be provided from the battery of the second mobile device to the battery of the first mobile device. For instance, in particular embodiments, the request may be initiated by the user from a computer-program application residing in the second mobile device that is activated by the user, who then enters the amount of charge to be provided to the battery of the first mobile device.

Once the request is received, a determination is made as to whether the amount of charge to be provided is likely to result in a battery charge of the second mobile device dropping below a threshold value before the battery of the second mobile device is recharged based on historical battery charge usage data of the second mobile device over a past period of time. For instance, in particular embodiments, the historical battery charge usage data may comprise a mean battery charge provided by the battery of the second mobile device over a period of time starting from a time the request is received to a time the battery of the second mobile device is likely to be recharged that is calculated based on battery charge usage for the second mobile device over the past period of time.

If the amount of charge is not likely to result in the battery charge of the second mobile device dropping below the threshold value before being recharged, then the battery of the first mobile device is charged with the amount of charge from the battery of the second mobile device over the connection. However, if the amount of charge is likely to result in the battery charge of the second mobile device dropping below the threshold value before being recharged, then the user is advised of such. For instance, in particular embodiments, the user may be advised of such and asked whether to continue with charging the battery of the first mobile device despite the amount of charge is likely to result in the battery charge of the second mobile device dropping below the threshold value before being recharged. While in other embodiments, the user may be advised of such and provided with a safe amount of charge that is not likely to result in the battery charge of the second mobile device dropping below the threshold value before being recharged.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
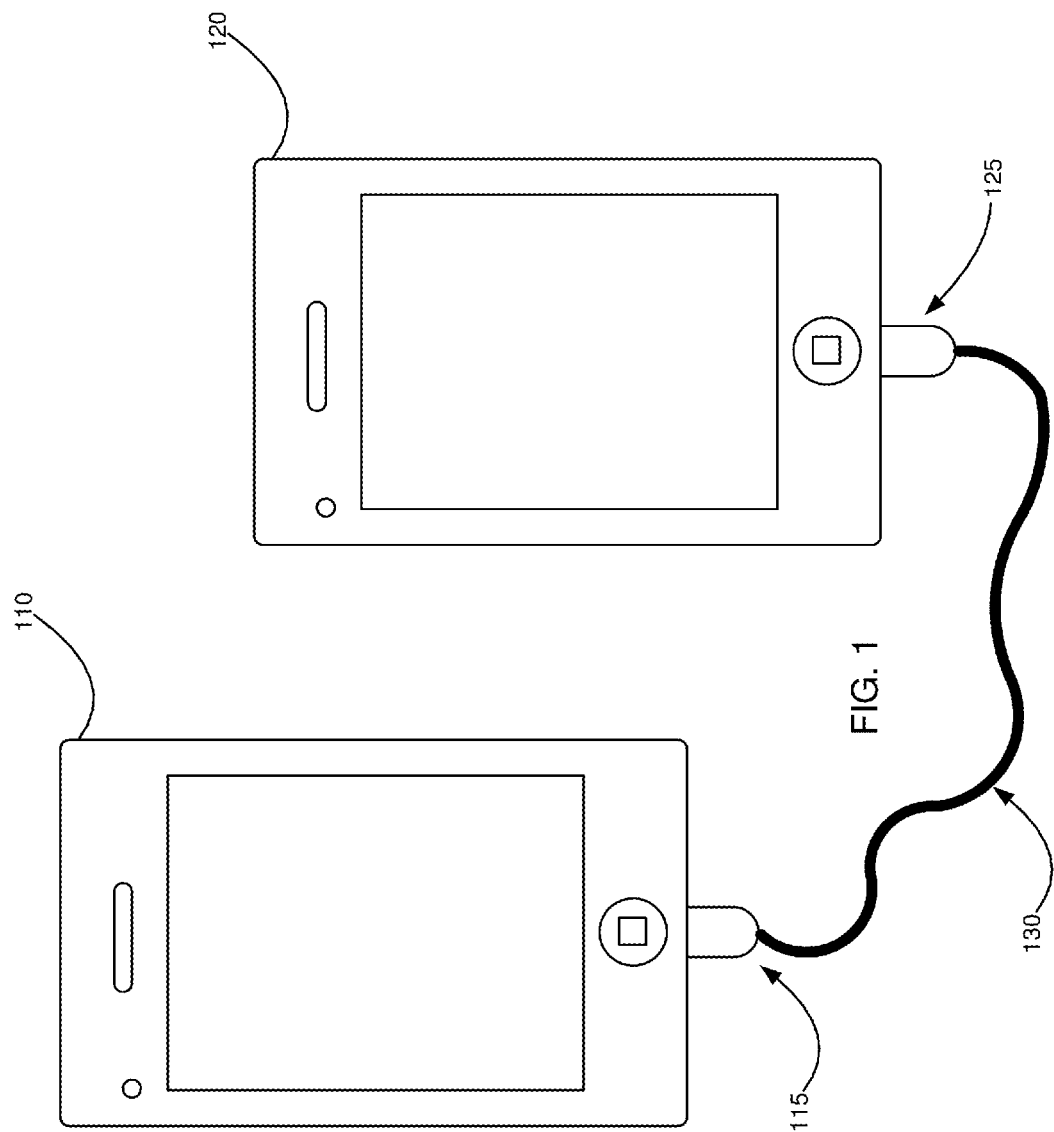
FIG. 1 displays an architecture that may be employed in charging the battery of a first mobile device from the battery of a second mobile device in accordance with various technologies and concepts disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Charging Architecture

FIG. 1 shows one embodiment of an architecture illustrating charging of a mobile device according to the various technologies disclosed herein. The architecture includes a first mobile device 120 and a second mobile device 110 coupled together by some type of connection 130. Depending on the embodiment, the mobile devices 110, 120 may be any one of a number of different mobile devices such as, for example, a smart phone or tablet. Further, each of the mobile devices 110, 120 includes a battery, not shown, as known in the art.

With respect to the architecture shown in FIG. 1, the connection 130 coupling the two mobile devices 110, 120 is a cable such as a USB cord with a plug 115, 125 on each end of the cord that connects into a USB port on each of the mobile devices 110, 120. For instance, in particular embodiments, the plugs 115, 125 may be a Micro-A or Micro-B plug and the USB ports of the mobile devices 110, 120 may be Micro-AB sockets. In other embodiments, the connection 130 coupling the two devices 110, 120 may be based on inductive charging (also known as wireless charging) that uses an electromagnetic field to transfer energy between the two devices 110, 120. For instance, in particular embodiments, each of the mobile devices 110, 120 includes an induction coil to create an alternating electromagnetic field from which one of the devices 110, 120 can take power and convert it back into electrical current to charge the device's battery.

Exemplary System Operation

The logical operations described herein may be implemented (1) as a sequence of computer implemented acts or one or more program modules running on a mobile device 110, 120 and/or (2) as interconnected machine logic circuits or circuit modules within the mobile device 110, 120. The implementation is a matter of choice dependent on the performance and other requirements of the mobile device 110, 120. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Historical Battery Usage Module

Figure 2:
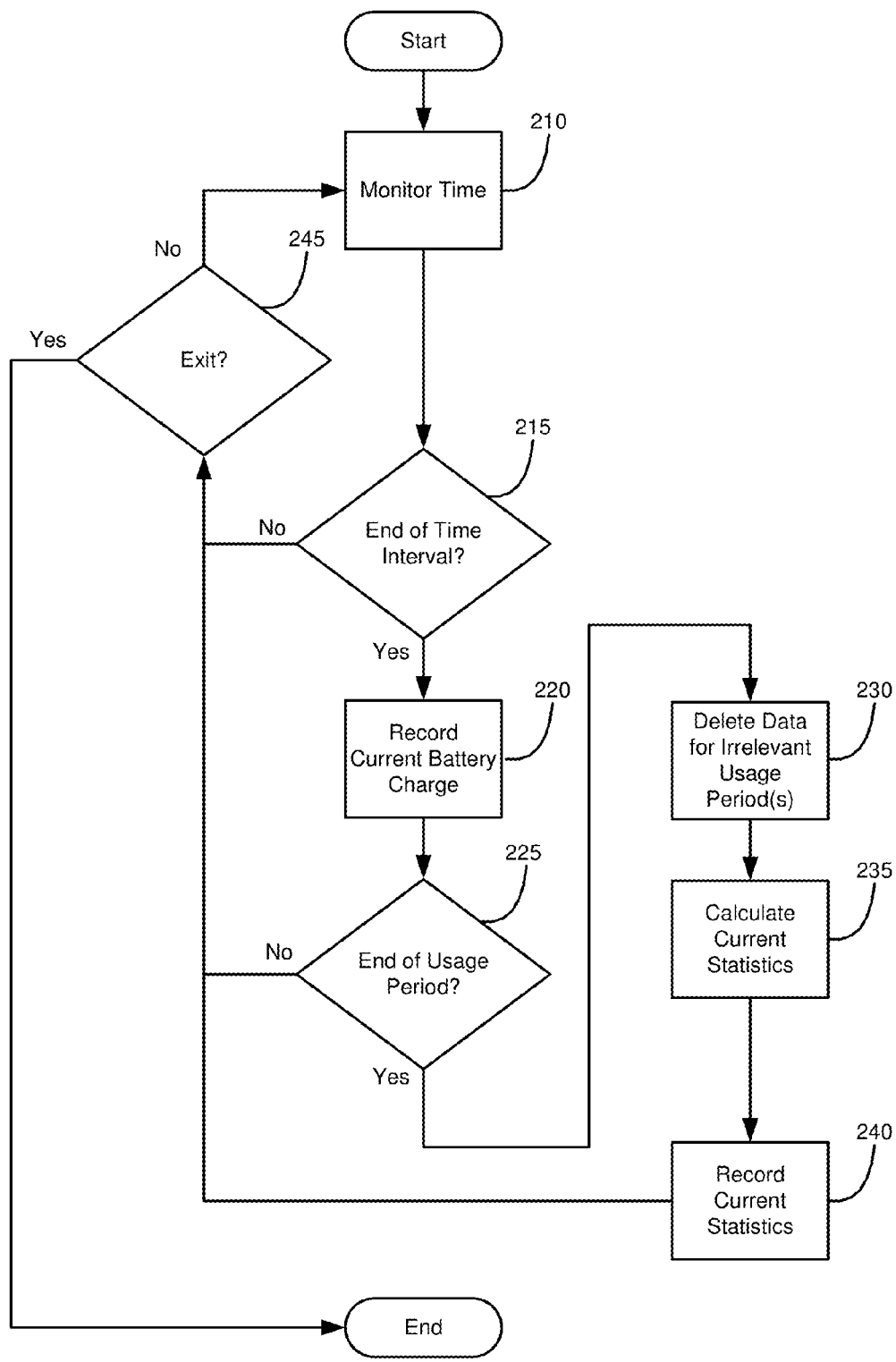
FIG. 2 illustrates an embodiment of a process flow that may be used in recording historical battery usage data in accordance with various technologies and concepts disclosed herein.

FIG. 2 illustrates a process flow that may be used to record historical battery usage data for a mobile device 110 according to various embodiments. Depending on the embodiment, this process flow may be carried out by a module that has been installed on the device 110 prior to a user receiving the device 110 or by a module downloaded to the device 110 once the user has received the device 110. For instance, the module for carrying out the functionality of this process flow may be a software application downloaded from an "app store" provided by Apple® or Google® to the user's mobile device 110. Regardless of the source of the module, the module is referred to herein as the historical battery usage (HBU) module for purposes of describing this module. Thus, the flow diagram shown in FIG. 2 may correspond to operations carried out by a processor in the mobile device 110 as it executes the HBU module stored in the mobile device's volatile and/or nonvolatile memory.

Turning now to FIG. 2, for this particular process flow, the HBU module monitors the time in Operation 210 to determine when the module should record a battery charge measurement. For instance, in particular embodiments, the time period for recording a measurement may be at the beginning of every hour or every thirty minutes, or some other periodic time period. Thus, in Operation 215, the HBU module determines whether a time interval has been reached for recording a measurement of the current battery charge of the device 110. If not, then the HBU module determines whether it has received an indication to exit and stop monitoring the battery charge for the device in Operation 245. For example, the HBU module may be a software application running on the device 110 and the user of the device 110 may decide to shutdown or stop the software application from running. If HBU module determines that it should not exit, then the module continues to monitor the time until a time interval for recording a measurement is reached.

Once a time interval for recording a measurement is reached, the HBU module records the current battery charge of the mobile device 110 in Operation 220. At this point, the HBU module determines whether the end of a usage period has been reached in Operation 225. A usage period is generally understood to be a period of time defined as a normal cycle of using the mobile device 110 from the time the battery of the device 110 has been charged to the time the mobile device 110 is recharged. For instance, one user may routinely plug in his device 110 every night right before he goes to bed. During the week, the user typically goes to bed around 10:00 p.m. Thus, in this example, the user may define the usage period to be 10:00 p.m. to 9:59 p.m. the following day. However, in other instances, the user may not routinely charge the mobile device 110 at the same time every day and/or may charge the device 110 at multiple times during the day. For example, the user may plug in his mobile device 110 to his computer for an hour everyday while he is at work to partially recharge the battery and then plug the device 110 into a charger overnight to fully recharge the battery. Therefore, in these instances, the usage period may not necessarily be the period of time from one charge to the next and may be some logical construct of time such as a day (e.g., 12:00 a.m. to 11:59 p.m.), two days, or a week.

Accordingly, if the HBU module determines that the end of a usage period has been reached, then the HBU module deletes any historical battery usage data for an irrelevant usage periods in Operation 230. In various embodiments, in addition to usage periods, a user of the mobile device 110 may also indicate the amount or length of usage periods to keep current in memory. For instance, returning to the example in which the user has defined the usage period to be a day, the user may decide to keep battery usage data for the past seven days (e.g., week). Depending on the circumstances, the user may decide the length of usage periods based on how much memory the user may wish to tie up on the mobile device 110 in storing such data. Thus in the example, if the current usage period that has just ended is a Tuesday, then the HBU module would delete the battery usage data recorded for the previous Tuesday. In the above embodiments, the user may configure these various time periods and related information, while in other embodiments, the HBU module may rely on default values.

Figure 3:
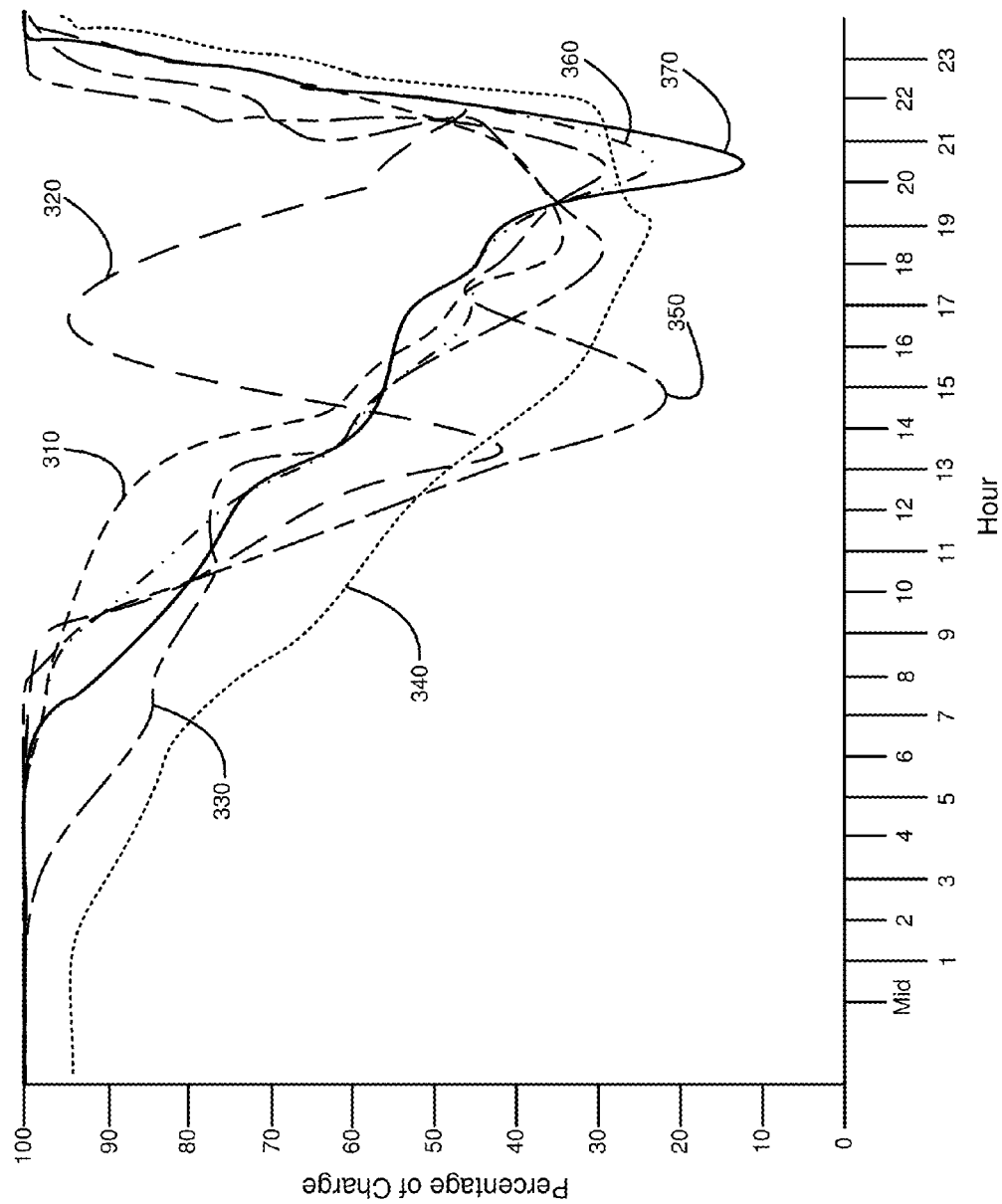
FIG. 3 provides a graphical representation of historical battery usage data.

Turning to FIG. 3, a graphical representation of collected battery usage data is shown for a mobile device 110. In this instance, the historical battery usage data is stored for the device 110 for the past week and the usage period is defined as a day. In this example, each line on the graph represents the battery usage for each day of the week with the data being recorded every hour during the day. Therefore, in this example, line 310 is Sunday, line 320 is Monday, line 330 is Tuesday, line 340 is Wednesday, line 350 is Thursday, line 360 is Friday, and line 370 is Saturday. The vertical axis shows the percentage of charge the mobile device 110 had at the time the measurement was recorded and the horizontal axis shows the hours of a day in military time. Thus, looking at the graphical representation, the HBU module recorded a charge percentage of roughly 34% at 19:00 hours for Sunday 310. The HBU module then recorded a charge percentage of roughly 36% at 20:00 hours for Sunday 310. Therefore, it appears as though the user of the mobile device 310 had plugged in the device to a charger to recharge the device 310.

Returning now to FIG. 2, in Operation 235, the HBU module calculates current statistics on the collected battery usage data to be stored along with the historical battery usage data for the mobile device 110. As is discussed further below, these statistics are used in determining whether the amount of charge requested to be provided to a connected mobile device 120 is likely to deplete the current charge of the mobile device 110 too much based on historical battery usage for the device. Depending on the embodiment, a number of different statistics may be calculated based on the collected battery usage data such as, for example, mean time for when the device is charged, a mean battery charge used before charging, a mean battery charge for each time interval, and a mean battery charge provided during each time interval, and corresponding standard deviations and variances. Once the HBU module has calculated the current statistics for the collected battery usage data, the module saves the current statistics in Operation 240.

At this point, the HBU module returns to monitoring the time and repeats the process when another time interval and end of usage period is repeated. As mentioned, the recorded historical battery usage data including the statistics are then used when a request is received to charge a connected mobile device 120.

Charging Module

Figure 4:
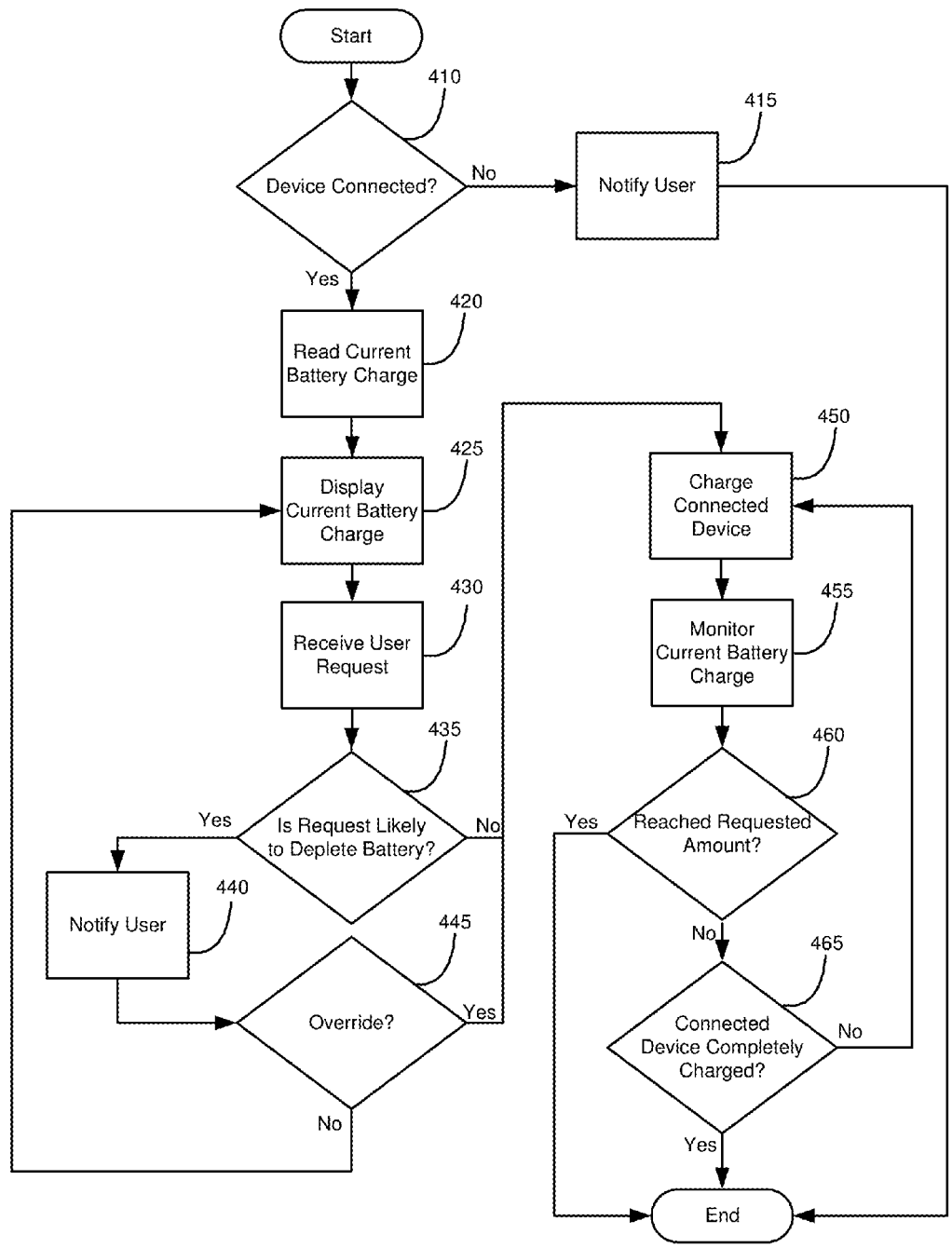
FIG. 4 illustrates an embodiment of a process flow that may be used in charging the battery of a mobile device in accordance with various technologies and concepts disclosed herein.

FIG. 4 illustrates a process flow that may be used to charge a connected mobile device 120 according to various embodiments. Again, depending on the embodiment, this process flow may be carried out by a charging module that has been installed on the device 110 prior to a user receiving the device 110 or downloaded to the device 110 once the user has received the device 110. Accordingly, the flow diagram shown in FIG. 4 may correspond to operations carried out by a processor in the mobile device 110 as it executes the charging module stored in the mobile device's volatile and/or nonvolatile memory.

An example is now provided to help facilitate the discussion of this process flow. A user of a mobile device 110 is asked to charge another user's mobile device 120 from his device 110. The user agrees and the two devices 110, 120 are connected via a USB cord. The time of day is approximately 1:00 p.m. The user then initiates the battery charging software application (e.g., the charging module) on his mobile device 110.

Upon being initiated, the charging module begins the process by determining whether a device 120 is connected to the user's mobile device 110 in Operation 410. For instance, in the example, the charging module determines whether something has been plugged into the USB port of the device 110. In another example in which the two mobile devices 110, 120 are connected via inductive charging, the mobile device 110 that is providing the charge provides a signal and senses for a presence of an object to receive a charge. In turn, the mobile device 120 that is to be charged indicates its presence by communicating received signal strength to the other mobile device 110 and the mobile device 110 detects this indication. Thus, in this example, the charging module determines whether the mobile device 110 that is to do the charging has detected the indication of signal strength from the mobile device 120 that is to receive the charge.

If charging module determines that a device 120 is not connected to the user's mobile device 110, then the module notifies the user in Operation 415 that it appears that a device 120 to charge has not been connected to the user's device 110. However, if the charging module determines that a device 120 is connected to the user's mobile device 110, then the module reads the current battery charge of the mobile device 110 in Operation 420 and displays the current battery charge on the device's screen in Operation 425.

At this point, the user enters the amount of charge to provide to the other user's mobile device 120 and selects a button to begin charging. The amount of charge to provide can be indicated in various ways, as will be seen. In turn, the charging module receives the user's request in Operation 430. The charging module then determines whether the requested amount of charge is likely to deplete the battery of the user's mobile device 110 to an unacceptable level before the device 110 is likely to be recharged in Operation 435. As previously mentioned, in various embodiments this determination is based on historical battery usage data recorded for the mobile device 110.

Figure 5:
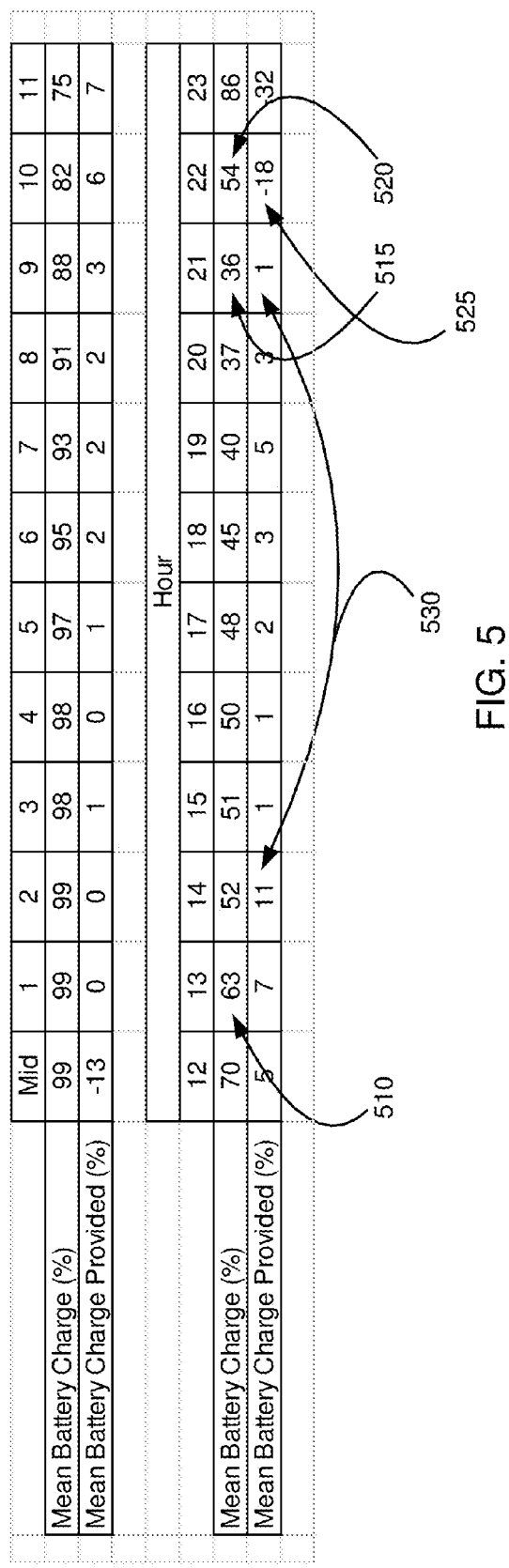
FIG. 5 provides a tabular representation of historical battery usage data.

For instance, returning to the example, the current battery charge for the user's mobile device 110 is 52% and the user has requested that 15% of the current battery charge be provided to the other user's connected mobile device 120. As you may recall the current time is approximately 1:00 p.m. and the user has set a minimum threshold (e.g., a safety threshold) of 20%. That is to say, the user has set a minimum threshold of which the user does not wish to ideally drop below before recharging the battery of the device 110. Turning now to FIG. 5, a table representation of the historical battery usage data is shown for the user's mobile device 110. Specifically, this table provides a mean battery charge at each hour of the day and a mean battery charge provided by the battery during each hour of the day based on the historical battery usage data shown in the graphical representation in FIG. 3. A negative mean battery charge provided indicates the battery "absorbed" the percent of charge during the hour. That is to say, the battery was charged the percent of charge during the hour.

Historically speaking, the mean battery charge of the user's mobile device 110 at 1:00 p.m. (i.e., hour 13 in the table) is 63% 510. It should be noted that a portion of the historical values may be used or an interpolation may occur in instances in which the current time is not on the hour. For instance, if the request is made at 1:15 p.m. instead of 1:00 p.m., the historical mean battery charge may be determined to be 60.25%. This determination is based on the historical mean battery charge provided between 1:00 p.m. and 2:00 p.m. is 11%. Accordingly, a fourth of 11% is 2.75% and 63% minus 2.75% equals 60.25%. A similar calculation can be made with respect to the historical mean battery charge provided. However, for purposes of simplicity in describing the functionality of the process flow shown in FIG. 4, the request is assumed to be made at 1:00 p.m.

Continuing on, the table also appears to show that the user's mobile device 110 is historically plugged into a charging device (e.g., a charger) to be recharged between 9:00 p.m. (i.e., hour 21 in the table) and 10:00 p.m. (i.e., hour 22 in the table). This is because the mean battery charge between these two hours goes from 36% 515 to 54% 520, which implies the device 110 is being charged. In addition, the mean battery charge provided between these two hours is −18% 525, indicating the battery charge increased by 18% between the hours of 9:00 p.m. and 10:00 p.m. Accordingly, the total amount of battery charge historically provided by the mobile device's battery from 1:00 p.m. (the time of the request) to 9:00 p.m. (the time the battery is historically recharged) is 27% based on the mean battery charges 530 historically provided between these hours (i.e., 11%+1%+1%+2%+3%+5%+3%+1%=27%).

Therefore, if the user's request to provide 15% of the current charge of the battery of the mobile device 110 to the battery of the connected mobile device 120 is granted, the battery of the mobile device is likely to be depleted to a level too low to sustain a charge above the safety threshold before the device 110 is likely to be recharged. This determination is based on if the request is granted, the current battery charge of the mobile device 110 would go from 52% to 37% (i.e., 52%−15%=37%). Thus, 37% minus the historical battery charge provided by the battery between 1:00 p.m. to 9:00 p.m. of 27% equals 10%, and this amount of charge is below the safety threshold of 20%. Accordingly, the amount of charge that can be provided to the battery of the connected mobile device 120 to likely stay above the safety threshold is 5% (i.e., 52%−20%−27%=5%).

Thus, returning to FIG. 4, the charging module determines in Operation 435 that the request is likely to deplete the battery of the mobile device 110 to a level too low to sustain a charge above the safety threshold before the device 110 is recharged. In response, the charging module notifies the user of such in Operation 440. Depending on the embodiment, the notification may provide additional information besides simply informing the user that providing the charge in the request is likely to deplete the battery too much. For instance, in particular embodiments, the charging module may also inform the user of the amount of charge (e.g., 5%) that may be provided to the battery of the connected device 120 and still likely stay above the safety threshold of 20% before the battery is recharged.

At this point, the user can elect to override the notification and charge the battery of the connected mobile device 120 with the requested amount anyway by selecting the option on his screen. Accordingly, the charging module determines whether the user has decided to override the notification in Operation 445. If so, then the charging module begins to charge the connected device 120 in Operation 450. However, if the user decides not to override the notification, then the charging module returns to Operation 425 and displays the current battery charge. Accordingly, the user may now select a more appropriate amount of charge to provide to the connected mobile device 120 and the process repeats the above operations for the new requested amount of charge. Although the above process is illustrated in terms of a percentage of charge that the user elects to provide, other embodiments may allow the user to indicate other equivalent forms, such as time (e.g., minutes of use) or measured energy (e.g., watt-hours).

Depending on the embodiment, the charging module charges the battery of the connected mobile device 120 using any number of different processes. For instance, in one embodiment, the charging module may charge the battery of the connected mobile device 120 by disguising the user's mobile device 110 to electrically emulate a charger or host, which enables the connected device 120 to charge its battery from the battery of the user's mobile device 110. Such a process is described in PCT Application WO2014/006619 entitled "Method and System of Charging a Mobile Device" and published on Jan. 9, 2014, the contents of which are incorporated into the present application for all that they teach.

While in another embodiment, the charging module may charge the battery of the connected mobile device 120 by using a discharge circuit, a charge circuit, and a switch circuit in which the switch circuit includes an exclusive-OR chip and a switch chip. A USB interface connects to the discharge circuit when an input terminal and an enabling terminal of the switch chip are set at a high level. The discharge circuit controls the battery of the user's mobile device 110 for charging the connected device via a USB cable and the USB interface. Such a process is described in U.S. Published Patent Application 2012/0231857 entitled "Mobile Phone and Method for Transferring Battery Power of the Mobile Device" published Sep. 13, 2012, the contents of which are incorporated into the present application for all that they teach.

As the charging module charges the battery of the connected device 120, the charging module continues to monitor the current battery charge of the user's device 110 in Operation 455. This is done to determine when the requested amount of charge has been provided to the battery of the connected device 120. Accordingly, in Operation 460, the charging module periodically determines whether the amount of charge provided to the battery of the connected mobile device 120 has reached the requested amount. If so, then the charging module discontinues charging the battery of the connected mobile device 120 and the process flow ends. However, if the requested amount has not been reached, the charging module determines whether the battery of the connected device 120 has been completely charged in Operation 465. That is to say, the charging device determines whether the battery of the connected mobile device 120 has reached a charge of 100% before the requested amount of charge has been reached, although in some embodiments a maximum threshold may be defined that is below 100%. If the battery of connected mobile device 120 has been fully charged, then the charging module discontinues charging the battery of the connected device 120 and the process flow ends. If not, then the charging module continues to charge the battery of the connected mobile device 120 and to monitor the same.

Figure 6:
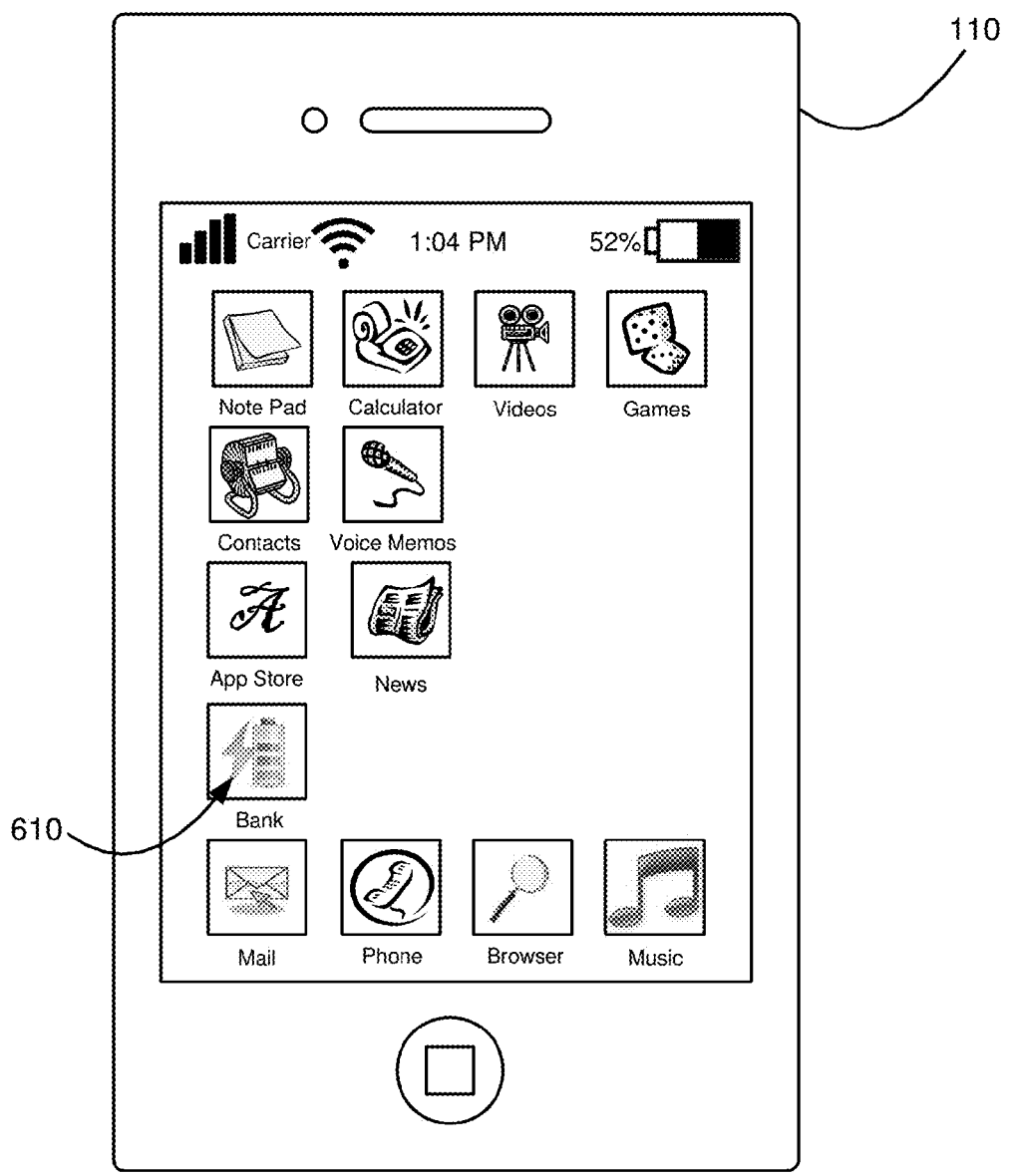
FIGS. 6, 7, and 8 provide embodiments of displays on a mobile device using a software application in accordance with various technologies and concepts disclosed herein.
Figure 7:
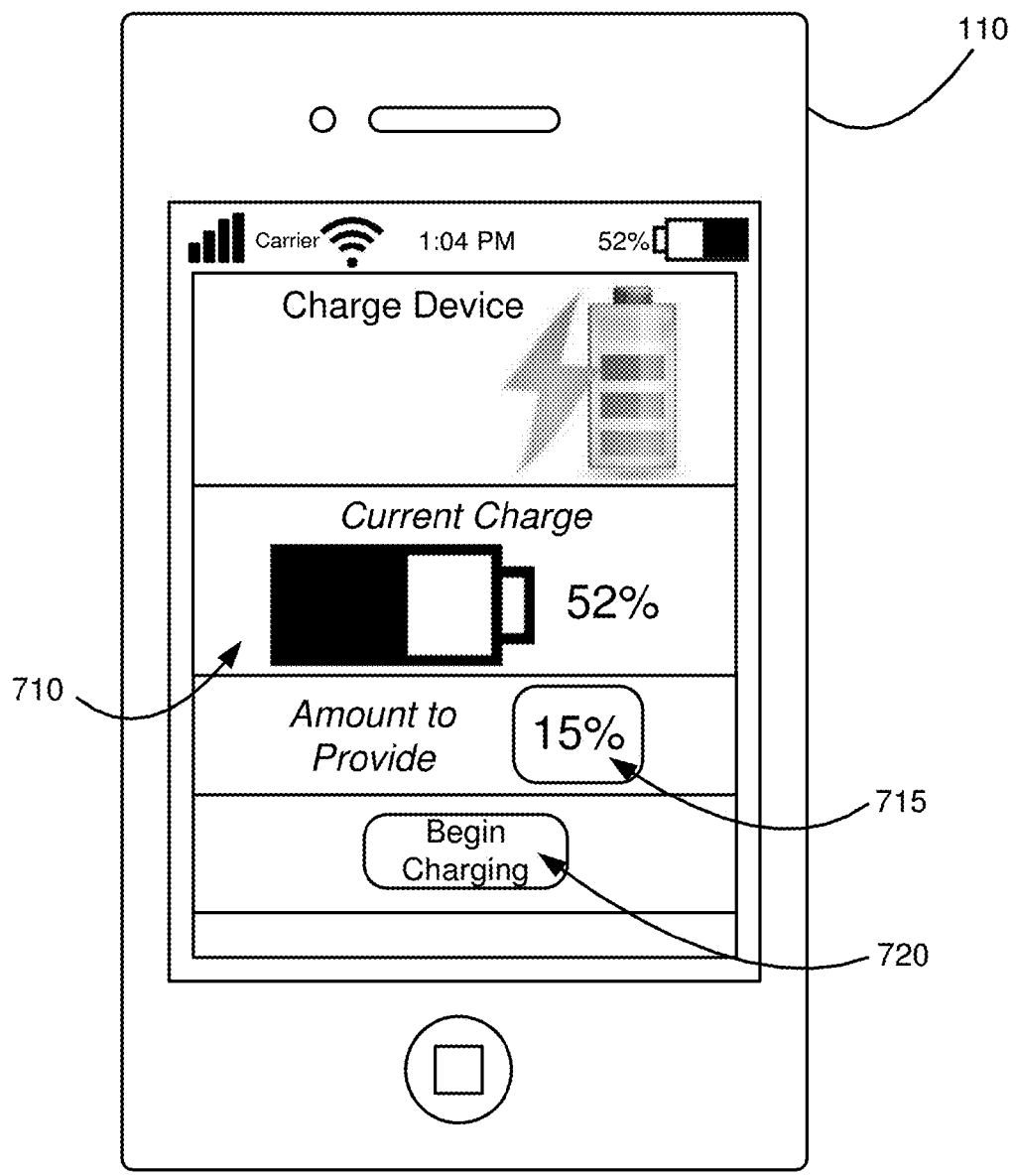
Figure 8:
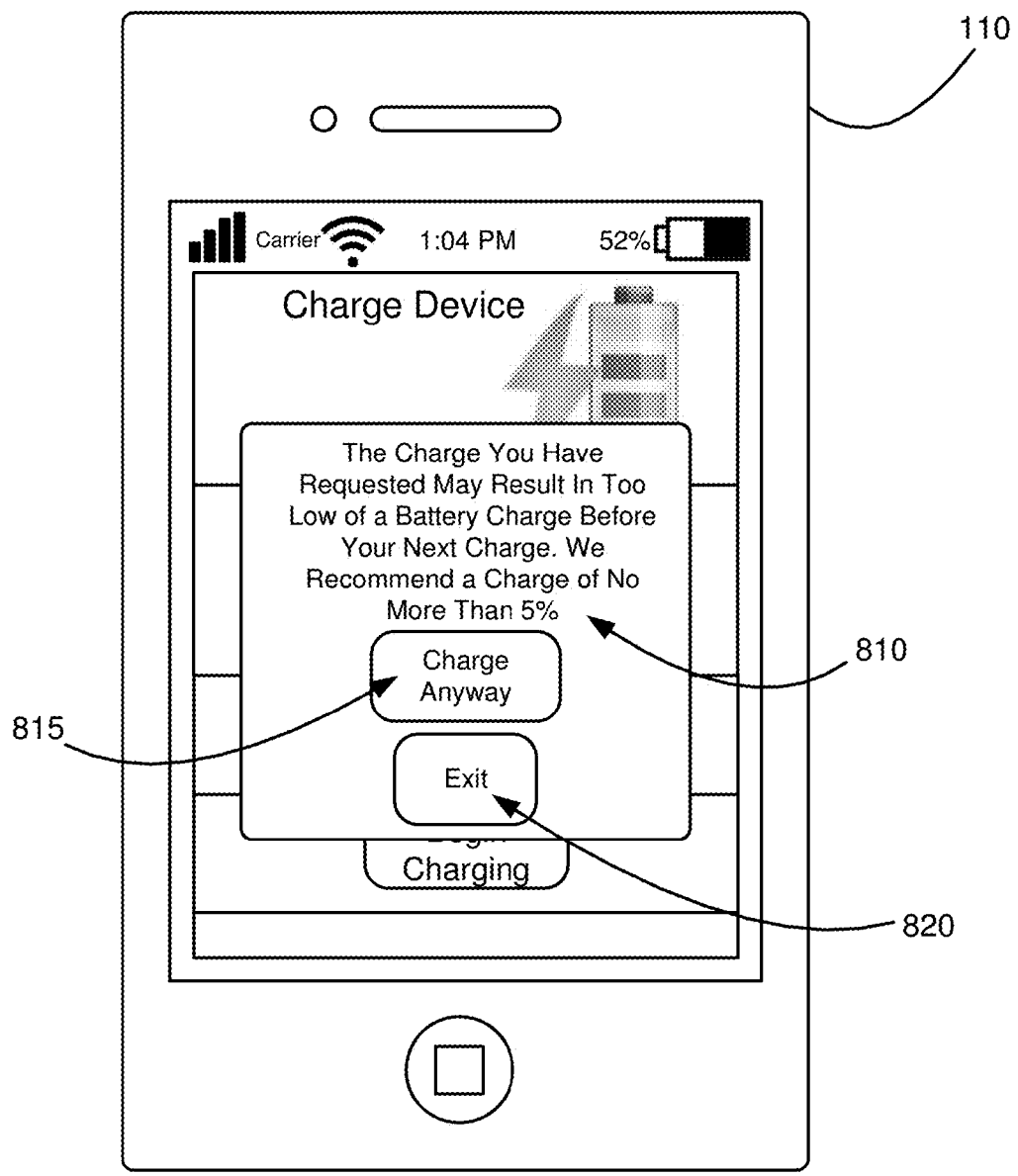

Turning now to FIGS. 6, 7, and 8, these figures provide embodiments of screen shots of the battery charging software application (e.g., charging module) that may be used to charge the battery of a connected mobile device 120. In FIG. 6, an icon 610 for the software application is shown on a main screen of the user's mobile device 110. Accordingly, the user selects the icon 610 when he would like to charge the battery of a connected mobile device 120 to "launch" the software application on his mobile device 110.

Therefore, upon launching the application, the display shown in FIG. 7 is provided on the user's mobile device's screen. In this instance, the display shows the current battery charge 710 of 52% and allows the user to indicate the amount of charge to provide 715 to the connected mobile device 120. Once the user has enter a number for the amount of charge to provide, the user selects the "Begin Charging" button 720 to begin the process flow. At this point, the charging module performs the operations described above with respect to the process flow shown in FIG. 4.

If the charging module determines that the requested amount of battery charge is likely to deplete the battery to a level too low to sustain a charge above the safety threshold before the device 110 is recharged, then the charging module may provide a notification to the user of the mobile device 110 such as shown in FIG. 8. In this instance, a "pop-up" message 810 has been provided informing the user that the requested charge amount may result in too low of a battery charge before the user's next charge of the battery. In addition, the "pop-up" message 810 provides a recommendation of the maximum amount of charge the user may safely provide to the battery of the connected mobile device 120. In response, the user may decide to go ahead and charge the battery of the connected mobile device 120 with the requested amount by selecting the "Charge Anyway" button 815 or the user may decide to select the "Exit" button 820, which brings the user back to the original screen shown in FIG. 6. At this point, the user may enter a lesser amount for the requested charge.

Current Battery Usage Module

It is noted that the technologies and concepts disclosed thus far in the present application may be used in other contexts besides charging the battery of a connected mobile device 120. For instance, in particular embodiments, the technologies and concepts disclosed thus far in the present application may be used to monitor the current battery usage of a mobile device 110 with respect to the applications and peripheries currently being powered by the battery of the mobile device 110. For example, the user of a mobile device may be streaming music to the device 110 to listen to while also using the GPS capabilities on the device 110 to guide the user while walking to a meeting through a city. Thus, the user may be interested to know whether the combination of streaming music and using the GPS capabilities may deplete the battery charge of the device too much if used for a set period of time such as thirty minutes or an hour.

Figure 9:
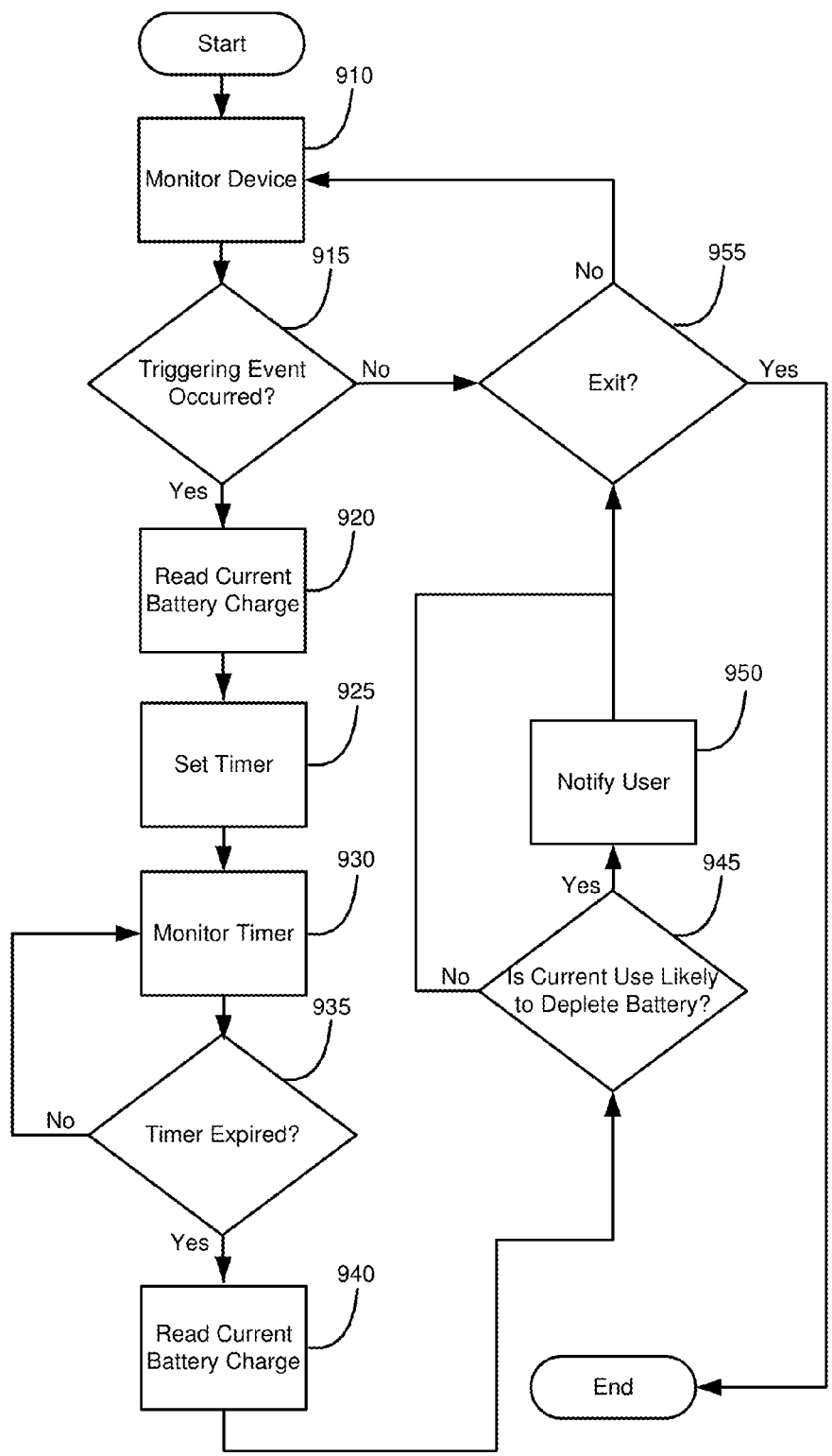
FIG. 9 illustrates an embodiment of a process flow that may be used in monitoring current battery usage in accordance with various technologies and concepts disclosed herein.

Accordingly, FIG. 9 illustrates a process flow that may be used to monitor the current battery usage of a mobile device 110 according to various embodiments. Again, depending on the embodiment, this process flow may be carried out by a current battery usage (CBU) module that has been installed on the device 110 prior to a user receiving the device 110 or downloaded to the device 110 once the user has received the device 110. Thus, the flow diagram shown in FIG. 9 may correspond to operations carried out by a processor in the mobile device 110 as it executes the CBU module stored in the mobile device's volatile and/or nonvolatile memory. Further, it should be noted that in particular embodiments, the functionality of this process flow may be carried out by the HBU module or charging module previously discussed as opposed to a separate module such as the CBU module.

Turning now to FIG. 9, the CBU module begins the process flow by monitoring the mobile device 110 in Operation 910. For instance, this particular operation is carried out by the CBU module in various embodiments by monitoring any activities (e.g., software applications running and/or peripheries connected to the device 110) that are using power generated from the device's battery. For example, the user of the device 110 may be streaming music thru a software application running on the device and/or the user may have connected external memory storage to the device's USB port. Those of ordinary skill in the art can envision countless activities that may require power generated from the device's battery.

At some time interval (e.g., every five seconds), the CBU module determines whether a triggering event has occurred in Operation 915. Depending on the embodiment, a triggering event may be defined as any number of different events such as a software application becoming activated and/or a peripheral being connected to the mobile device 110. With that said, typically a triggering event involves an activity that requires power from the mobile device's battery in order to function. For example, the user of the device 110 may initiate a software application on the device 110 for using the device's GPS capabilities. However, such an activity is not always required to trigger an event. For instance, in particular embodiments, the user of the device 100 may simply trigger an event manually by indicating so on the device 110. For example, the user may open an application on the device 110 and select a button to "Check Current Battery Usage."

Accordingly, if the CBU module determines a triggering event has not occurred, then the CBU module determines whether it has received an indication to exit and stop monitoring the current battery usage for the device in Operation 955. For example, like the HBU module previously discussed, the CBU module may be a software application running on the device 110 and the user of the device 110 may decide to shutdown or stop the application from running. If the CBU module determines that it should not exit, then the module continues to monitor the device 110.

If, however, the CBU module determines that a triggering event has occurred, then the CBU module reads the current battery charge of the mobile device 110 in Operation 920. At this point, the CBU module sets a timer in Operation 925 and monitors the timer in Operation 930. In this instance, the timer is set to expire at some pre-determined amount of time. For example, the timer may be set to expire in five minutes, ten minutes, or fifteen minutes. However, generally speaking, the timer is set to an amount of time in various embodiments to allow for an accurate measure of the rate the battery is currently being depleted (drained) based on the activities performed by the device. In particular embodiments, the timer may be set to an amount of time based on the number of activities and/or on what specific activities are currently being performed. For example, the timer may be set to five minutes if four or more activities are currently being performed by the device, ten minutes if three activities are currently being performed by the device, and fifteen minutes if less than three activities are currently being performed by the device. Further, the timer may be set to a first amount of time if the new activity that triggered the event is a peripheral being connected to the device 110 and set to a second amount of time if the new activity that triggered the event is a software application being invoked. Those of ordinary skill in the art can envision multiple criteria that may be defined for setting the length of the timer in light of this disclosure.

Thus, returning to the example, the user of the mobile device may be walking to his meeting near 1:00 p.m. in the city and is currently streaming music through headphones connected to the device 110 as he is walking along. At some point during his walk (e.g., at approximately 1:00 p.m.), he may decide he needs directions and activates the GPS application residing on his device 110 and enters in the directions for the building where the meeting is to take place. Thus, when the user activates the GPS application, the CBU module determines this action as a triggering event, reads the current battery charge of the mobile device 110 to be 52%, and sets the timer to expire in fifteen minutes.

Accordingly, at this point, the CBU module periodically determines whether the timer has expired in Operation 935. When the timer does expired, the CBU module then reads the current battery charge again in Operation 940. Thus, returning to the example, the CBU module reads the current battery charge to be 48%. Accordingly, the CBU module determines whether the current battery usage for the mobile device 110 is likely to deplete the battery of the mobile device 110 to a level too low to sustain a charge above the safety threshold before the device is recharged in Operation 945.

In this instance, the battery charge has dropped 4% in fifteen minutes, which equates to a rate of 16% an hour. You may recall that the battery of the device 110 historically provides 7% of the battery charge between the hours of 1:00 p.m. (column 13 of FIG. 5) and 2:00 p.m. (column 14 of FIG. 5) and the extra amount of charge that the mobile device 110 may provide in this state (with a current charge of 52% at 1:00 p.m.) is 5% to stay at a level that will safely keep the battery charge above the minimum threshold of 20% before the device 110 is recharged. Therefore, at the current rate of usage, the battery of the device 110 is likely to use an additional 9% of the battery charge between the hours of 1:00 p.m. and 2:00 p.m. if the user continues to stream music during this hour while also using the GPS capabilities on the mobile device 110. Thus, in this example, the user is likely to deplete the battery of the mobile device 110 to a level too low to sustain a charge above the safety threshold before the device is recharged if he continues to stream music while also using the GPS capabilities on the device 110.

Accordingly, the CBU module notifies the user of this condition in Operation 950. For instance, in particular embodiments, the CBU module may "pop up" a message on the screen of the mobile device 110 warning the user of this condition. At this point, the CBU module then determines whether it has received an indication to exit and stop monitoring the battery usage for the device in Operation 955. If not, the CBU module then returns to Operation 910 and continues to monitor the mobile device 110.

As a result of the warning provided to the user, the user may then take action to regulate the operation of the device 110 at a level that is not likely to deplete the battery to a level too low to sustain a charge above the safety threshold before the device is recharged. For instance, the user may stop streaming music while he is using the GPS capabilities on the device 110 and return to streaming music once he is done with using the GPS capabilities on the device 110.

Exemplary Mobile Device

Figure 10:
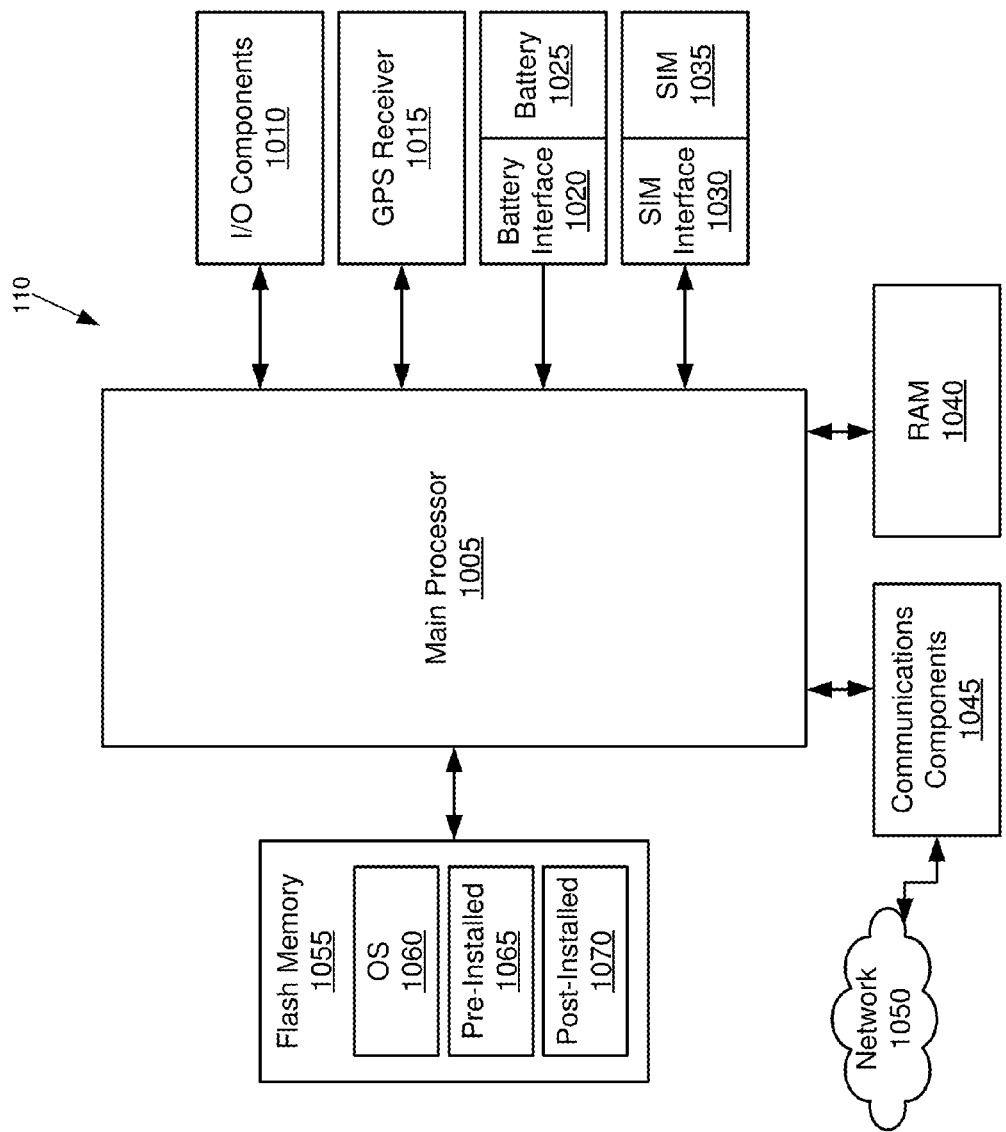
FIG. 10 illustrates an embodiment of a mobile device for practicing various technologies and concepts disclosed herein.

FIG. 10 is an exemplary schematic diagram of a mobile device 110 that may be used in various embodiments to practice the technologies disclosed herein. The embodiment of the mobile device 110 shown in FIG. 10 includes a main processor 1005 that controls the overall operations of the device 110. Communication functions are carried out by various communication components 1045 and these functions may relate to data and voice communications. For instance, the communication components 1045 may receive data communications such as text messages and/or email messages over some type of wireless network 1050 such as a carrier's cellular network or a Wi-Fi network. Likewise, the communication components 1045 may receive voice communications (e.g., telephone calls) over the wireless network 1050, typically the carrier's cellular network.

Typically, the mobile device 110 is configured to send and receive communications over the wireless network 1050 once the device 110 has been registered with the carrier. Thus, access for the device 110 is normally identified with a particular individual known to the carrier as a subscriber. To identify the subscriber, in particular embodiments, the mobile device 110 may use a component such as a Subscriber Identity Module (SIM) card 1035 and this card 1035 may be inserted into an interface 1030 so that the card 1035 may communicate with the network 1050. In other embodiments, the mobile device 110 may use some other type of identifier component such as a Removable User Identity Module (RUIM) or a Universal Subscriber Identity Module (USIM).

For the embodiment shown in FIG. 10, the main processor 1005 interacts with a Global Positioning System (GPS) receiver 1015 for the purpose of determining the mobile device's current location. In addition, the main processor 1005 interacts with one or more Input/Output (I/O) components 1010 such as a display, a keyboard, a speaker, and/or a microphone. For instance, the mobile device 110 may include a display and keyboard that is used for functionality such as entering text messages to send over the wireless network 1050 or to perform some other type of functionality such as scrolling through a contact list stored on the device 110 or using a calendar application available on the device 110. Further, for the embodiment shown in FIG. 10, the mobile device 110 is battery powered and includes a battery interface 1020 which includes associated charging circuitry, for receiving one or more batteries 1025 that provide power to the device 110.

Voice communications are typically received as signals outputted to a speaker and signals transmitted by a microphone. In particular instances, a display may also be used to provide additional information such as the identity of a caller, duration of a communication, or other communication related information. In addition, in some instances, the mobile device 110 may include touch-screen capabilities for the display that allows a user to enter data communications such as text messages, emails, and information into software applications (e.g., modules) residing on the device 110. Further, in some instances, the mobile device 110 may include one or more auxiliary I/O components 1010 such as a mouse, track ball, infrared capabilities, blue tooth capabilities, and/or dynamic button pressing capabilities.

The particular embodiment shown in FIG. 10 includes non-volatile memory such as flash memory 1055 in this instance. However, in other embodiments, the device 110 may include other types of persistent memory such as read-only memory (ROM). The flash memory 1055 stores operating system code 1060 for the mobile device 110 that is executed by the main processor 1005. In addition, the flash memory 1055 may store one or more pre-installed modules 1065 and/or one or more post-installed modules 1070. Further, depending on the embodiment, portions of the operating system code 1060, pre-installed modules 1065, and/or post-installed modules 1070 may be temporarily loaded and stored in volatile memory such as random-access memory (RAM) 1040.

The pre-installed modules 1065 include modules that are typically installed on the mobile device 110 prior to being sold. For instance, the manufacturer of the device 110 may install a message module that allows the user of the device 110 to send and receive text messages that are typically stored in the flash memory 1055. In addition, the manufacturer may install a personal information manager (PIM) module for managing and organizing e-mail, text messages, contacts, calendar events, voice mails, etc.

In contrast, post-installed modules 1070 are typically modules that are added to the mobile device 110 after the device 110 has been sold. In many instances, these modules are third-party software applications that are downloaded to the mobile device 110 and such applications may be configured to perform a number of different functionality. For instance, a third-party software application that may be downloaded to the mobile device 110 is the HBU module, charging module, and/or CBU module as previously discussed. Depending on the circumstances, a post-installed module 1070 may be downloaded to the device 110 over the wireless network 1050 or via an auxiliary I/O component 1010 such as a data port (e.g., USB port) that may be used to plug the device 110 into a data source such as the user's home personal computer.

Conclusion

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for regulating current battery usage of a mobile device, the method comprising the steps of:
   monitoring the mobile device by a computer-program application residing in the mobile device for a triggering event, the triggering event comprising an activity beginning that requires power to be provided from a battery of the mobile device to function;
      taking a first reading of a current battery charge of the battery by the computer-program application upon detecting the triggering event;
      taking a second reading of the current battery charge of the battery by the computer-program application after a period of time has passed from when the triggering event was detected;
      determining the current battery usage based on a difference between the first reading and the second reading of the current battery charge by the computer-program application;
      determining by the computer-program application whether the current battery usage is likely to result in the current battery charge of the battery dropping below a threshold value before the battery is recharged based on historical battery charge usage data of the mobile device over a past period of time; and
   advising a user of the mobile device via the computer-program application in response to determining the current battery usage is likely to result in the current battery charge of the mobile device dropping below the threshold value before the battery of the mobile device is recharged.

2. The method of claim 1, wherein the activity beginning comprises one of another computer-program application residing in the mobile device being activated or a peripheral being connected to the mobile device.

3. The method of claim 1, wherein the mobile device comprise a cellular smart phone or a tablet.

4. The method of claim 1, wherein the period of time used to determine when to take the second reading of the current battery charge allows for an accurate measurement of a rate the battery is being depleted based on the activity functioning.

5. The method of claim 1, wherein the step of advising the user comprises identifying to the user that continued functioning of the activity is likely to result in the current battery charge of the mobile device dropping below the threshold value before the battery is recharged.

6. The method of claim 1, wherein the historical battery charge usage data comprises a mean battery charge provided by the battery of the mobile device over a period of time starting from a time the triggering event was detected to a time the battery is likely to be recharged that is calculated based on battery charge usage for the mobile device over the past period of time.

7. A mobile device comprising a computer-program application residing in the mobile device configured to:
   monitor the mobile device for a triggering event, the triggering event comprising an activity beginning that requires power to be provided from a battery of the mobile device to function;
   take a first reading of a current battery charge of the battery upon detecting the triggering event;
   take a second reading of the current battery charge of the battery after a period of time has passed from when the triggering event was detected;
   determine the current battery usage based on a difference between the first reading and the second reading of the current battery charge;
   determine whether the current battery usage is likely to result in the current battery charge of the battery dropping below a threshold value before the battery is recharged based on historical battery charge usage data of the mobile device over a past period of time; and
   advise a user of the mobile device in response to determining the current battery usage is likely to result in the current battery charge of the mobile device dropping below the threshold value before the battery of the mobile device is recharged.

8. The mobile device of claim 7, wherein the activity beginning comprises one of another computer-program application residing in the mobile device being activated or a peripheral being connected to the mobile device.

9. The mobile device of claim 7, wherein the mobile device is a cellular smart phone or a tablet.

10. The mobile device of claim 7, wherein the period of time used to determine when to take the second reading of the current battery charge allows for an accurate measurement of a rate the battery is being depleted based on the activity functioning.

11. The mobile device of claim 7, wherein the computer-program application is configured to advise the user by identifying to the user that continued functioning of the activity is likely to result in the current battery charge of the mobile device dropping below the threshold value before the battery is recharged.

12. The mobile device of claim 7, wherein the historical battery charge usage data comprises a mean battery charge provided by the battery of the mobile device over a period of time starting from a time the triggering event was detected to a time the battery is likely to be recharged that is calculated based on battery charge usage for the mobile device over the past period of time.

13. A non-transitory, computer-readable medium comprising computer-executable instructions configured when executed to cause a mobile device to:
monitor for a triggering event, the triggering event comprising an activity beginning that requires power to be provided from a battery of the mobile device to function;
take a first reading of a current battery charge of the battery upon detecting the triggering event;
take a second reading of the current battery charge of the battery after a period of time has passed from when the triggering event was detected;
determine the current battery usage based on a difference between the first reading and the second reading of the current battery charge;
determine whether the current battery usage is likely to result in the current battery charge of the battery dropping below a threshold value before the battery is recharged based on historical battery charge usage data of the mobile device over a past period of time; and
advise a user of the mobile device in response to determining the current battery usage is likely to result in the current battery charge of the mobile device dropping below the threshold value before the battery of the mobile device is recharged.

14. The non-transitory, computer-readable medium of claim 13, wherein the activity beginning comprises one of another computer-program application residing in the mobile device being activated or a peripheral being connected to the mobile device.

15. The non-transitory, computer-readable medium of claim 13, wherein the mobile device is a cellular smart phone or a tablet.

16. The non-transitory, computer-readable medium of claim 13, wherein the period of time used to determine when to take the second reading of the current battery charge allows for an accurate measurement of a rate the battery is being depleted based on the activity functioning.

17. The non-transitory, computer-readable medium of claim 13, wherein the computer-executable instructions are configured to cause the mobile device to advise the user by identifying to the user that continued functioning of the activity is likely to result in the current battery charge of the mobile device dropping below the threshold value before the battery is recharged.

18. The non-transitory, computer-readable medium of claim 13, wherein the historical battery charge usage data comprises a mean battery charge provided by the battery of the mobile device over a period of time starting from a time the triggering event was detected to a time the battery is likely to be recharged that is calculated based on battery charge usage for the mobile device over the past period of time.

* * * * *